(12) United States Patent
Takagi

(10) Patent No.: US 8,227,101 B2
(45) Date of Patent: Jul. 24, 2012

(54) POWER STORAGE UNIT WITH COOLANT RESISTIVITY DETECTOR

(75) Inventor: Masaru Takagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 303 days.

(21) Appl. No.: 12/451,612

(22) PCT Filed: Jun. 19, 2008

(86) PCT No.: PCT/IB2008/001590
§ 371 (c)(1),
(2), (4) Date: Nov. 20, 2009

(87) PCT Pub. No.: WO2008/155630
PCT Pub. Date: Dec. 24, 2008

(65) Prior Publication Data
US 2010/0136389 A1    Jun. 3, 2010

(30) Foreign Application Priority Data
Jun. 20, 2007 (JP) .................. 2007-163108

(51) Int. Cl.
*H01M 10/48*    (2006.01)

(52) U.S. Cl. ........... 429/90; 429/120; 429/62; 320/150; 320/153

(58) Field of Classification Search ........... 429/120, 429/90, 62; 320/150, 153
See application file for complete search history.

(56) References Cited

U.S. PATENT DOCUMENTS

| 6,411,063 B1 * | 6/2002 | Kouzu et al. .............. 320/150 |
| 2004/0170877 A1 * | 9/2004 | Wakabayashi .............. 429/22 |
| 2004/0265660 A1 * | 12/2004 | Reuschel et al. ............. 429/26 |

FOREIGN PATENT DOCUMENTS

| EP | 1 722 217 A1 | 11/2006 |
| JP | 06124733 A * | 5/1994 |
| JP | A-06-124733 | 5/1994 |
| JP | A-10-255750 | 9/1998 |
| JP | A-2003-051298 | 2/2003 |
| JP | A-2005-129459 | 5/2005 |
| WO | WO 03/041198 A1 | 5/2003 |

OTHER PUBLICATIONS

Chinese Office Action issued in Application No. CN 200880021038.X dated Aug. 2, 2011 (w/ English Translation).
International Search Report issued in International Application No. PCT/IB2008/001590 on Oct. 6, 2008.
Written Opinion of the International Search Authority issued in International Application No. PCT/IB2008/001590 on Oct. 6, 2008.
International Preliminary Report on Patentability issued in International Application No. PCT/IB2008/001590 on Aug. 18, 2009.

* cited by examiner

*Primary Examiner* — Barbara Gilliam
*Assistant Examiner* — Zachary Best
(74) *Attorney, Agent, or Firm* — Oliff & Berridge, PLC

(57) ABSTRACT

A battery unit is constituted of a battery assembly, coolant for cooling the battery assembly, a battery case containing the battery assembly and the coolant, an electric resistivity detector for detecting the electric resistivity of the coolant, and a battery ECU that determines whether the electric resistivity detected by the electric resistivity detector is equal to or lower than $10^2$ Ωm. If the electric resistivity is equal to or lower than $10^2$ Ωm, the battery ECU commands a battery protection circuit to interrupt the current output from the battery assembly.

13 Claims, 9 Drawing Sheets

POWER STORAGE UNIT WITH COOLANT RESISTIVITY DETECTOR

BACKGROUND OF THE INVENTION

1. Field of the Invention

The invention relates to a power storage unit constituted of a power module and a casing containing the power storage module and coolant for cooling the power storage module, and the invention also relates to a vehicle having a power storage unit.

2. Description of the Related Art

Power storage units used as drive power sources or auxiliary power sources for electric vehicles and hybrid vehicles provide a high power output and therefore tend to deteriorate progressively if they are used at a temperature higher than their proper operation temperatures. To prevent such deterioration, their power storage portions need to be cooled as needed.

One of such power storage units is disclosed in Japanese Patent Application Publication No. 06-124733 (JP-A-06-124733). This power storage unit has a battery assembly constituted of a plurality of batteries connected to each other, coolant for cooling the battery assembly, and a casing containing the battery assembly and the coolant. A gas-discharge valve is provided at each battery of the battery assembly. According to this power storage unit, even if gas is produced in each battery as a result of electric decomposition of electrolyte solution when overcharging the battery, or the like, the gas is discharged via the gas-discharge valve.

Further, an agitator for agitating the coolant is provided in this power storage unit. However, when the gas is thus discharged from the battery, in some cases, the electrolyte solution and the active materials in the battery are brought into the coolant together with the discharged gas, and as a result, the electric resistance of the coolant decreases.

Further, the electric resistance of the coolant may also decrease if foreign matter such as water or impurities enters the casing from the outside.

Further, in some cases, when cooling the battery assembly, natural convection of coolant occurs in the casing, causing the coolant to collide and thus wear the casing and the battery can. In this case, metal fragment produced as a result of the wearing of the casing, thereby the electric resistance of the coolant may be reduced. Such a decrease in the electric resistance of the coolant is significant in a case where the agitator for forcibly agitating the coolant is provided as described in Japanese Patent Application Publication No. 06-124733 (JP-A-06-124733).

If the electric resistance of the coolant decreases as mentioned above, it may cause short circuits at the battery assembly, resulting in an increase in the battery temperature.

SUMMARY OF THE INVENTION

The invention provides a power storage unit structured to prevent short circuits at a power storage module and a vehicle comprising such a power storage unit.

The first aspect of the invention relates to a power storage unit having: a power storage module; a coolant for cooling the power storage module; a casing containing the power storage module and the coolant; detecting means for detecting an electric resistance of the coolant; and determining means for determining whether the electric resistance detected by the detecting means is equal to or lower than a threshold. The determining means outputs a signal indicates the electric resistance is reduced if the electric resistance detected by the detecting means is equal to or lower than the threshold.

The above-described power storage unit may further have a power storage module protection portion that interrupts current output from the power storage module in response to the signal indicates the electric resistance is reduced being output from the determining means. Further, the above-described power storage unit may have notifying means for notifying an abnormality of the power storage module in response to the signal indicates the electric resistance is reduced being output from the determining means. Further, the above-described power storage unit may have a power storage amount monitoring portion that raises a target power storage amount of the power storage module in response to the signal indicates the electric resistance is reduced being output from the determining means. Further, the above-described power storage unit may have a discharge valve via which gas produced by the power storage module is discharged from the casing when the pressure of the gas produced by the power storage module reaches a predetermined pressure.

The second aspect of the invention relates to a power storage unit having: a power storage module; a coolant for cooling the power storage module; a casing containing the power storage module and the coolant; detecting means for detecting an electric resistance of the coolant; notifying means for notifying an abnormality of the power storage module depending upon the electric resistance detected by the detecting means; and a power storage module protection portion that interrupts current output from the power storage module depending upon the electric resistance detected by the detecting means. The notifying means notifies an abnormality of the power storage module if the electric resistance detected by the detecting means is equal to or lower than a first threshold, and the power storage module protection portion interrupts the current output from the power storage module if the electric resistance detected by the detecting means is equal to or lower than a second threshold that is equal to or lower than the first threshold.

The third aspect of the invention relates to a power storage unit having: a power storage module; a coolant for cooling the power storage module; a casing containing the power storage module and the coolant; detecting means for detecting an electric resistance of the coolant; a power storage amount monitoring portion that changes a target power storage amount of the power storage module depending upon the electric resistance detected by the detecting means; a power storage module protection portion that interrupts current output from the power storage module depending upon the electric resistance detected by the detecting means. The determining means raises the target power storage amount of the power storage module if the electric resistance detected by the detecting means is equal to or lower than a first threshold, and the power storage module protection portion interrupts the current output from the power storage module if the electric resistance detected by the detecting means is equal to or lower than a second threshold that is equal to or lower than the first threshold.

In any of the above-described power storage units according to the first to third aspects of the invention, the power storage module may be constituted of a plurality of power storage elements electrically connected to each other, and agitating means for agitating the coolant may be provided.

In any of the above-described power storage units according to the first to third aspects Of the invention, the power storage module may be soaked in the coolant.

The forth aspect of the invention relates to a vehicle incorporating any of the power storage units according to the first to the third aspects of the invention.

According to the first to the third aspects of the invention, the electric resistance reducing signal is output if the electric resistance of the coolant is equal to or lower than the threshold, and therefore various measures can be taken before short circuits occur at the power storage module.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

First Example Embodiment

Figure 1:
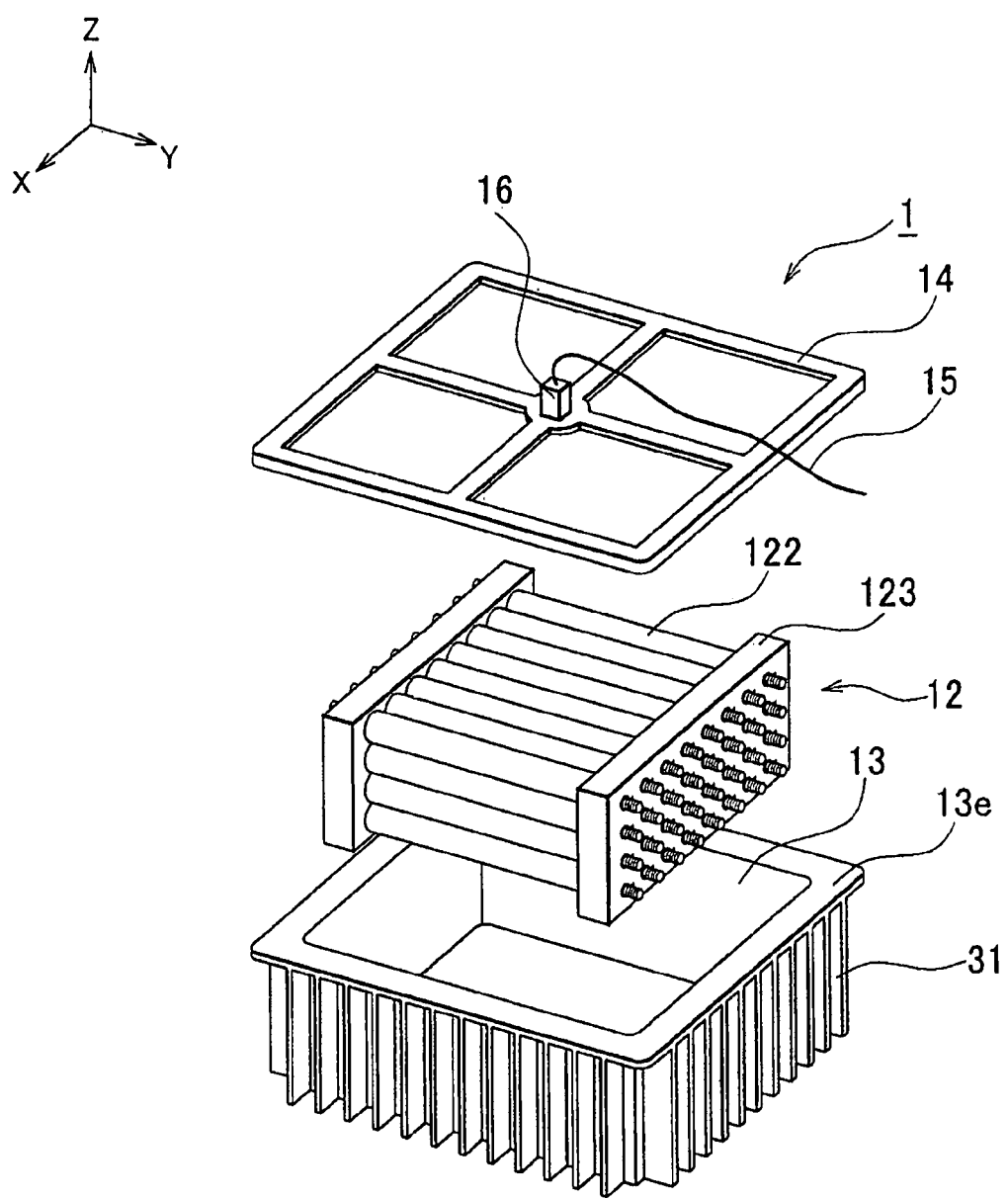
FIG. 1 is an exploded perspective view of a power storage unit.
Figure 2:
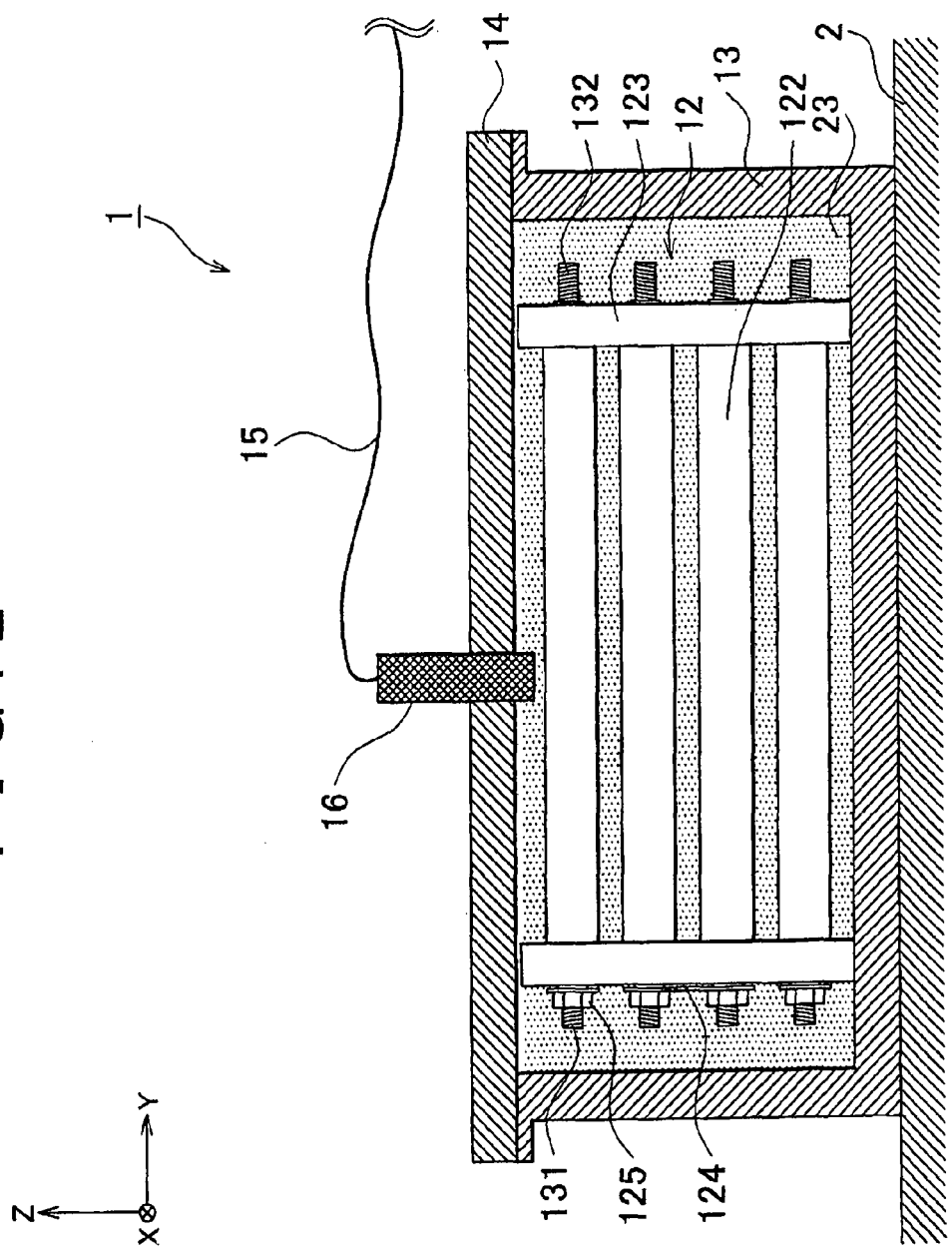
FIG. 2 is a cross-sectional view of the power storage unit.

FIG. 1 is an exploded perspective view of a power storage unit 1 according to the example embodiment of the invention, and FIG. 2 is a cross-sectional view of the power storage unit 1. Hereinafter, the outline of the power storage unit 1 will be described with reference to FIG. 1 and FIG. 2.

The power storage unit 1 is used as a drive power source or an auxiliary power source for an electric vehicle or a hybrid vehicle and it is mounted on a floor panel 2 beneath the passenger's seat.

A battery assembly 12 and coolant 23 for cooling the battery assembly 12 are provided in a battery case 13, and an electric resistivity detector 16 is attached on a case lid 14 of the battery case 13 to detect the electric resistivity of the coolant 23. The invention is not limited in the case detecting the resistivity, it can detect the resistance of the coolant 23 instead. Note that the battery case 13 and the case lid 14 correspond to "casing" in the invention, the battery assembly 12 corresponds to "power storage module" in the invention, and the electric resistivity detector 16 corresponds to "detecting means" in the invention.

Having the electric resistivity detector 16 for detecting the electric resistivity of the coolant 23, the power storage unit 1 is capable of detecting a decrease in the electric resistivity of the coolant 23 immediately. Therefore, as will be described later, the power storage unit 1 is capable of preventing heat generation of the battery assembly 12 due to short circuits by interrupting the current output from the battery assembly 12.

Next, the structure of each portion of the power storage unit 1 will be described in detail. The battery case 13 has a box-like shape having an opening at the upper side thereof. A number of radiation fins 31 are formed on the outer peripheral face of the battery case 13. The radiation fins 31 increase the area of contact with the air surrounding and thus facilitate the heat radiation from the battery assembly 12. Note that the radiation fins 31 are not shown in FIG. 2.

The battery case 13 is made of, for example, metal having a high heat conductivity, such as stainless steel.

An attachment bracket, which is not shown in the drawings, is formed at the outer peripheral face of the battery case 13, and this bracket is fixed on the floor panel 2 beneath the passenger's seat, whereby the power storage unit 1 is fixed on the floor panel 2.

The battery assembly 12 is constituted of a plurality of cylindrical batteries 122 that are arranged close to each other and supported by a pair of battery holders 123 facing each other. Electrode threaded shafts 131 and 132 are provided at the both ends of each cylindrical battery 122. The electrode threaded shafts 131 and 132 protrude from the respective battery holders 123. The respective cylindrical batteries 122 are connected in series via bus bars 124. The bus bars 124 are fixed in position by nuts 125 to the electrode threaded shafts 131 and 132, respectively. Note that the cylindrical batteries 122 correspond to "power storage element" in the invention.

As such, because the battery assembly 12 constituted of the cylindrical batteries 122 connected to each other is used as a drive power source or an auxiliary power source for vehicles, heat is generated at the battery assembly 12 through its charging and discharging becomes great, and therefore cooling of the battery assembly 12 may not be sufficient if only cooling by cooling airflow. Thus, in the invention, for cooling the battery assembly 12, the battery assembly 12 is soaked in the coolant 23 that is more heat-conductive than gas.

The coolant 23 is preferably made of substance having a high specific heat capacity, a high thermal conductivity, and a high boiling point, does not corrode to the battery case 13 and the battery assembly 12, and having a high thermal decomposition resistance, a high air-oxidization resistance, a high electric decomposition resistance, and so on. Further, in a view of preventing short circuits between the electrode terminals, an insulative liquid is preferably used as the coolant 23.

For example, the coolant 23 may be selected from among various fluorine inactive fluids including Fluorinert, NovecHFE (hydrofluoroether) and Novec1230 (Products of Minnesota Mining & Manufacturing Co. (3M)). Alternatively, the coolant 23 may be selected from among various other fluids such as silicon oils.

Figure 3:
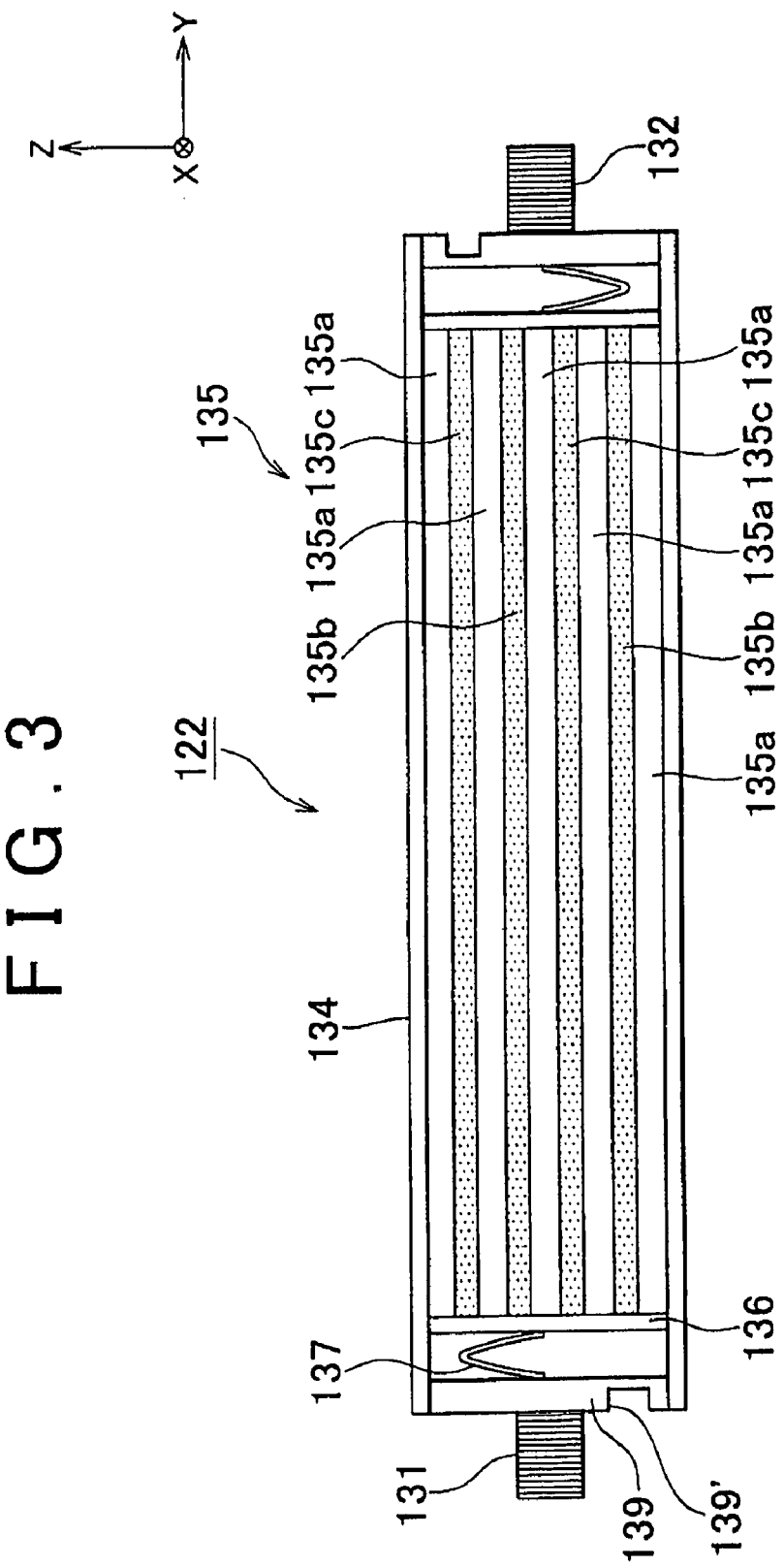
FIG. 3 is a cross-sectional view of a cylindrical battery.

Next, the structure of each cylindrical battery 122 will be described in detail with reference to FIG. 3. Referring to FIG. 3, an electrode assembly 135 is provided in a tubular battery can 134.

The electrode assembly 135 is constituted of an anode 135$b$ on the both faces of which a positive active material is applied and a cathode 135$c$ on the both faces of which a negative active material is applied, and the both electrodes are rolled up with a separator 135$a$ interposed therebetween. The tubular battery can 134 is filled with an electrolyte solution. Note that the electrolyte solution may be impregnated in the separator 135$a$.

The positive active material may be selected from, for example, various lithium-transition element composite oxides including $LiCoO_2$, $LiNiO_2$, $LiFeO_2$, $LiCuO_2$, LiMnO$_2$, LiMO$_2$ (M is at least two transition elements selected from the group consisting of Co, Ni, Fe, Cu, and Mn), and LiMn$_2$O$_4$. On the other hand, the negative active material may be selected from among various substances that can electrochemically adsorb and release lithium ions, such as natural graphite, synthetic graphite, coke, combusted organics, and metal chalcogenide.

The lithium salts used as a solute of the electrolyte solution may be selected, for example, from among LiClO$_4$, LiCF$_3$SO$_3$, LiPF$_6$, LiN(CF$_3$SO$_2$)$_2$, LiN(C$_2$F$_5$SO$_2$)$_2$, LiBF$_4$, LiSbF$_6$, and LiAsF$_6$, and the organic solvent for dissolving the lithium salts may be, for example, a solvent obtained by mixing cyclic carbonate ester (e.g., ethylene carbonates, propylene carbonates, vinylene carbonates, and butylene carbonates) and chain carbonate ester (e.g., dimethyl carbonate, diethyl carbonate, and methylethyl carbonate).

Collector plates 136, which are disc-shaped, are welded to the both longitudinal ends of the electrode assembly 135 (the both ends in Y direction). The collector plates 136 may be made from, for example, aluminum foils, stainless-steel foils, or copper foils.

The collector plates 136 are connected electrically, and mechanically, to holder plates 139 holding the electrode threaded shafts 131 and 132, respectively, via electric cables 137. Battery destruction valves 1139 are formed at the respective holder plates 139 at positions different from where the electrode threaded shafts 131 and 132 are present. These battery destruction valves 1139 are formed by hollowing the respective holder plates 139.

When the internal pressure of the battery can 134 increases beyond a limit pressure value (e.g., twice the standard atmosphere) due to the gas produced therein in the event of a certain battery abnormality, the battery destruction valves 1139 destruct so that the gas is released outside via the battery destruction valves 1139, thereby suppressing the increase in the internal pressure of the tubular battery can 134. However, as the gas is thus released from the battery can 134, the gas may force the electrolyte solution and the active materials out to the coolant 23 (See FIG. 2).

Referring back to FIG. 1, the case lid 14 is mounted on a cover attachment face 13*e* of the battery case 13 and fixed by bolts not shown in the drawings. The electric resistivity detector 16 for detecting the electric resistivity of the coolant 23 is provided at the center of the case lid 14 as viewed from above (viewed in the X-Y axes). The electric resistivity detector 16 is, for example, an insulated resistor (megaohm-m) that directly reads the electric resistivity of the coolant 23.

The electric resistivity of the coolant 23 detected by the electric resistivity detector 16 is output to a battery ECU 51 (See FIG. 4), which will be later described, via an electric cable 15.

Figure 4:
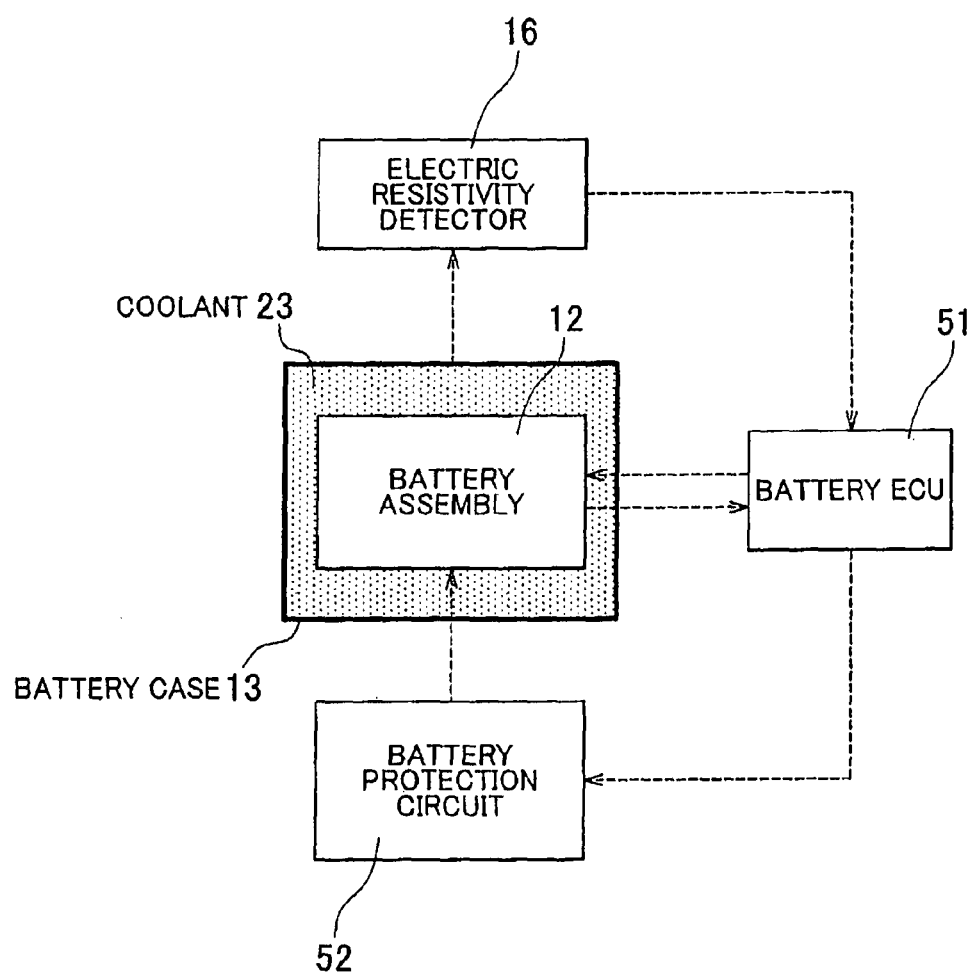
FIG. 4 is a block diagram showing the configuration of the circuit for interrupting the output current of the power storage unit.
Figure 5:
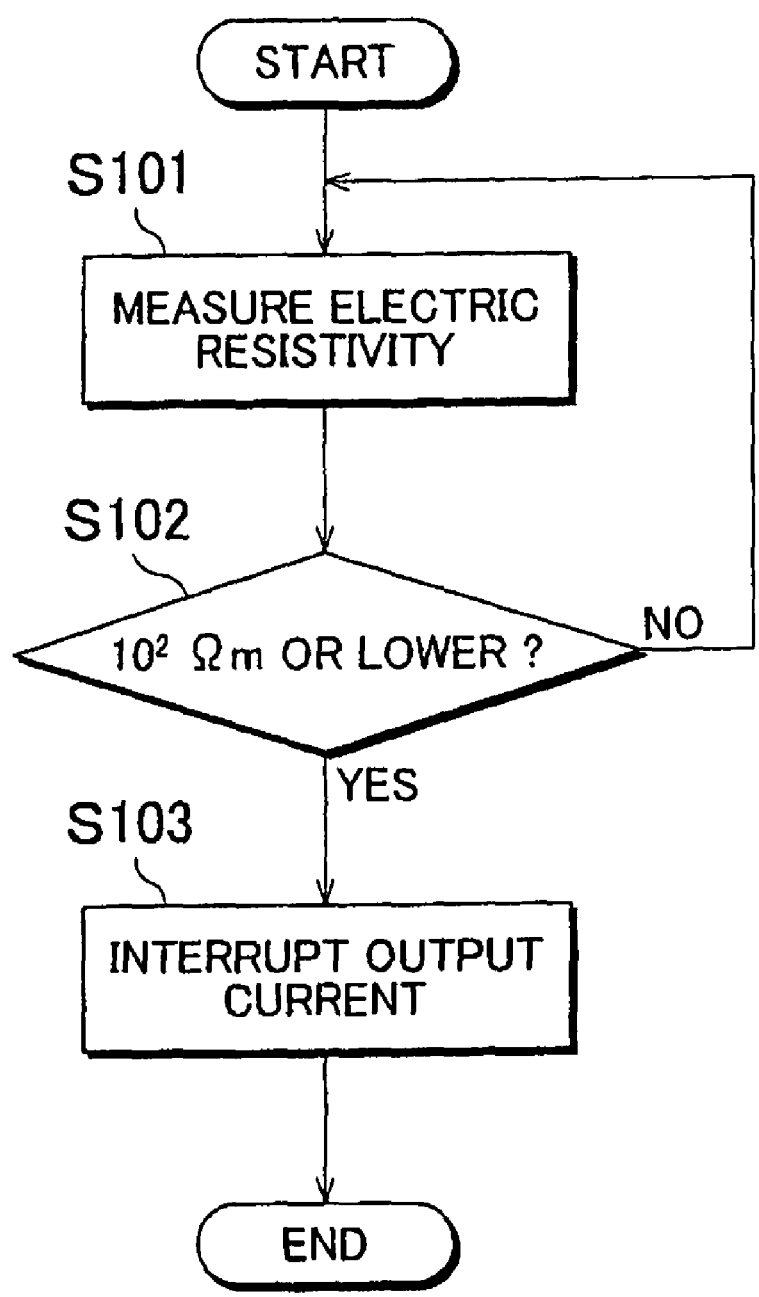
FIG. 5 is a flowchart illustrating the procedure of a method for interrupting the output current of the power storage unit.

Next, the method for interrupting the output current of the power storage unit will be described with reference to FIG. 4 and FIG. 5. FIG. 4 is a block diagram showing the configuration of the circuit for interrupting the output current of the power storage unit. In FIG. 4, the dotted lines represent the electric connections, and the arrows represent the signal directions. FIG. 5 is a flowchart illustrating the procedure of a method for interrupting the output current of the power storage unit.

The battery ECU 51 continuously measures the electric resistivity of the coolant 23 that is output from the electric resistivity detector 16 (step S101). The battery ECU 51 determines whether the electric resistivity of the coolant 23 has decreased to $10^2$ $\Omega$m, which is a threshold, or lower (step S102). If the electric resistivity of the coolant 23 is $10^2$ $\Omega$m or lower (step S102: YES), the battery ECU 51 outputs a signal commanding a battery protection circuit 52 to interrupt the electric circuit. Conversely, if the electric resistivity of the coolant 23 is higher than $10^2$ $\Omega$m (step S102: NO), the battery ECU 51 returns to step S101. Note that the battery ECU 51 corresponds to "determining means" in the invention, and the battery protection circuit 52 corresponds to "power storage module protection portion" in the invention, and the command signal for the battery protection circuit 52 corresponds to "signal indicates the electric resistance is reduced" in the invention.

In response to the command signal from the battery ECU 51, the battery protection circuit 52 interrupts the current output from the battery assembly 12 (step S103). More specifically, the battery protection circuit 52 interrupts the current output from the battery assembly 12 using a known technique, such as disconnecting the electric cables 137.

According to the example embodiment, as such, because the output current of the battery assembly 12 is immediately interrupted in response to a decrease in the electric resistivity of the coolant 23, heat generation of the battery assembly 12 due to short circuits can be suppressed.

Second Example Embodiment

Figure 6:
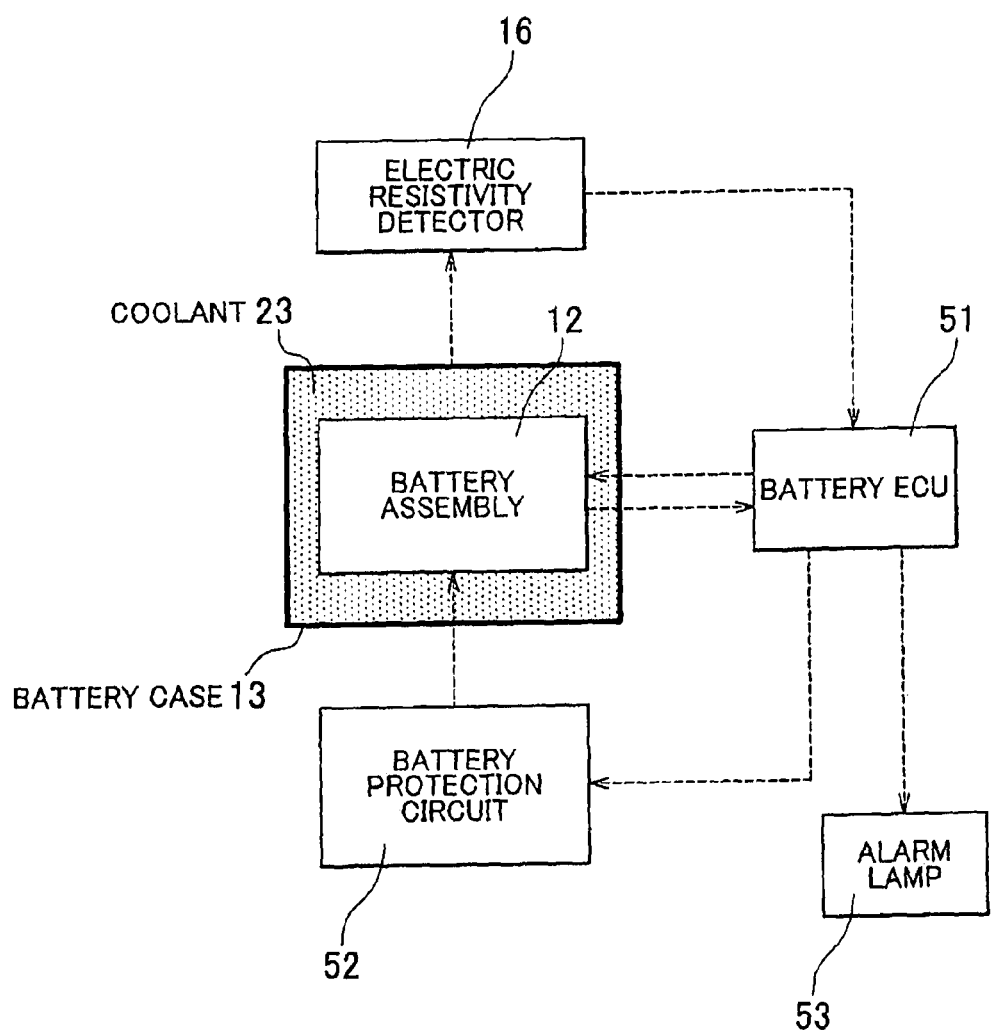
FIG. 6 is a block diagram showing the configuration of the circuit for preventing short circuits at the battery assembly.
Figure 7:
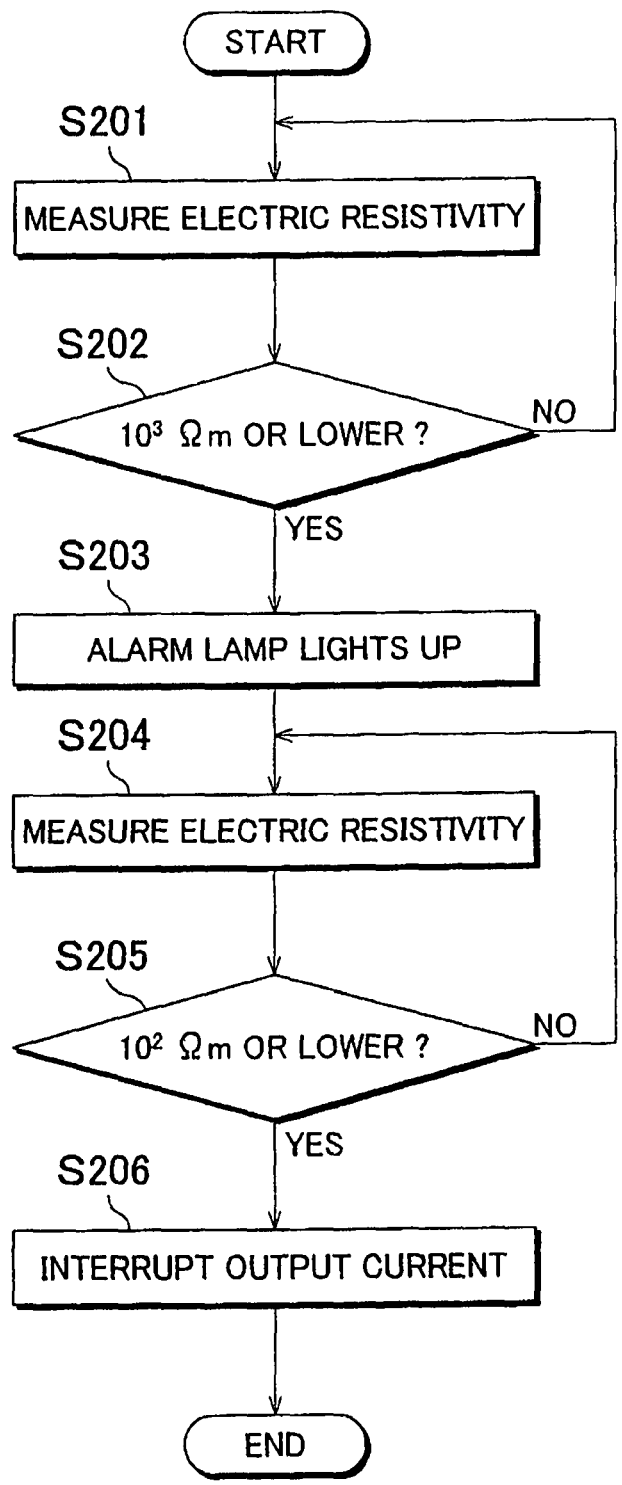
FIG. 7 is a flowchart illustrating the procedure of a method for preventing short circuits at the battery assembly (Second example embodiment)

Next, the second example embodiment of the invention will be described with reference to FIG. 6 and FIG. 7. FIG. 6 is a block diagram showing the configuration of the circuit for preventing short circuits at the battery assembly 12. In FIG. 6, the dotted lines represent the electric connections, and the arrows represent the signal directions. FIG. 7 is a flowchart illustrating the procedure of a method for preventing short circuits at the battery assembly 12.

In the first example embodiment, as described above, the battery ECU 51 interrupts the output current of the battery assembly 12 in response to a decrease in the electric resistivity of the coolant 23. Meanwhile, in the second example embodiment, the battery ECU 51 first warns the passenger using an alarm lamp 53 and then interrupts the output current of the battery assembly 12 in response to a decrease in the electric resistivity of the coolant 23. Note that the structural elements other than the alarm lamp 53 in the second example embodiment are identical to those in the first example embodiment and therefore they are not described here again. Also, note that the alarm lamp 53 corresponds to "notifying means" in the invention.

The battery ECU 51 continuously measures the electric resistivity of the coolant 23 that is output from the electric resistivity detector 16 (step S201). The battery ECU 51 determines whether the electric resistivity of the coolant 23 has decreased to $10^3$ $\Omega$m, which is a first threshold, or lower (step S202). At this time, if the electric resistivity of the coolant 23 is $10^3$ $\Omega$m or lower (step S202: YES), the battery ECU 51 outputs a signal commanding the alarm lamp 53 provided in the passenger compartment to light up. Conversely, if the electric resistivity of the coolant 23 is higher than $10^3$ $\Omega$m (step S202: NO), the battery ECU 51 returns to step S201. Note that the command signal for the alarm lamp 53 corresponds to "electric resistance reducing signal" in the invention.

Thus, the alarm lamp 53 lights up in response to the command signal from the battery ECU 51 (step S203), thereby notifying the passenger the necessity of battery change.

After the alarm lamp 53 has lit up, the battery ECU 51 determines whether the electric resistivity of the coolant 23 measured in step S204 has further decreased down to $10^2$ $\Omega$m, which is a second threshold, or lower (step S205). At this time, if the electric resistivity of the coolant 23 is $10^2$ $\Omega$m or lower (step S205: YES), the battery ECU 51 interrupts the output current of the battery assembly 12 in the same manner as in the first example embodiment (step S206). Conversely, if the electric resistivity of the coolant 23 is higher than $10^2$ Ωm (step S205: NO), the battery ECU 51 returns to step S204.

While the alarm lamp 53 is used as the notifying means in the second example embodiment, various other means (e.g., audio alarm) may alternatively be used.

Third Example Embodiment

Figure 8:
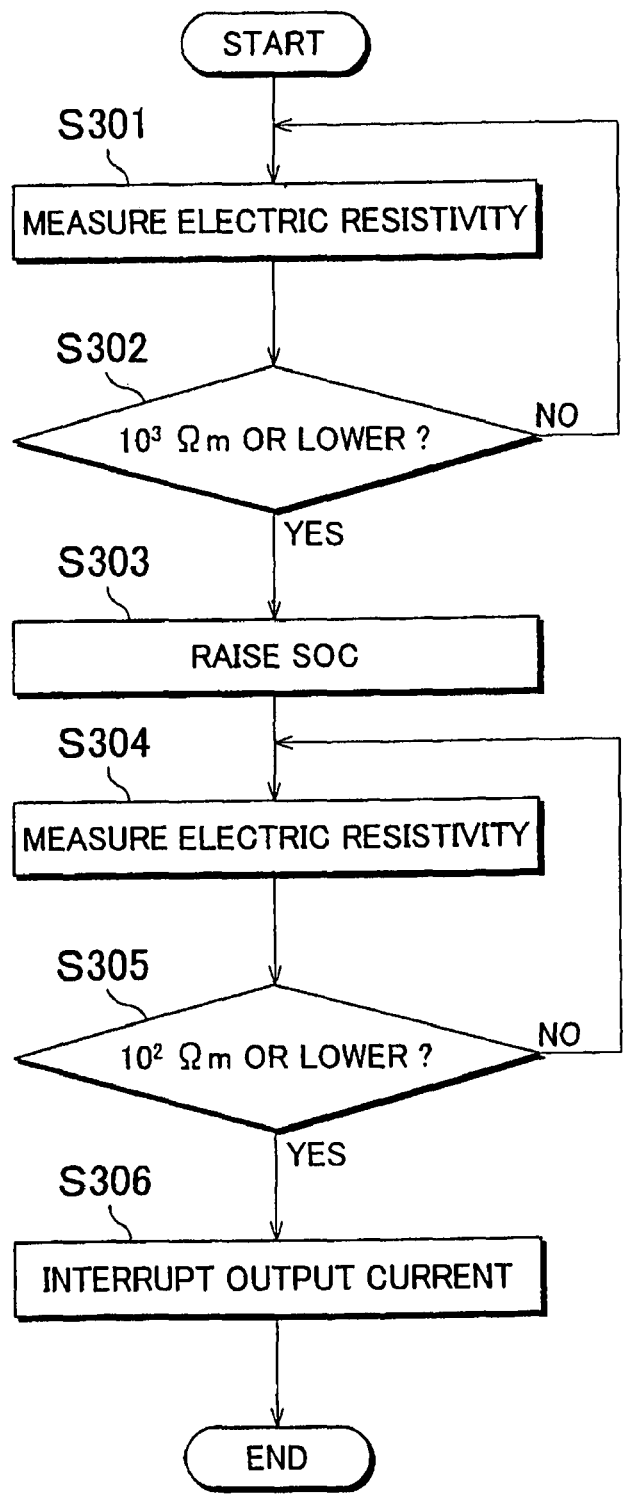
FIG. 8 is a flowchart illustrating the procedure of a method for preventing short circuits at the battery assembly (Third example embodiment)

Next, the third example embodiment of the invention will be described with reference to FIG. 8. FIG. 8 is a flowchart illustrating the procedure of a method for preventing short circuits in the battery assembly 12.

In the first example embodiment, the battery ECU 51 interrupts the output current of the battery assembly 12 in response to a decrease in the electric resistivity of the coolant 23. Meanwhile, in the third example embodiment, the battery ECU 51 first raises a target power storage amount SOC and then interrupts the output current of the battery assembly 12 in response to a decrease in the electric resistivity of the coolant 23. Note that the structural elements are identical to those in the first example embodiment and therefore they are not described here again.

The battery ECU 51 continuously measures the electric resistivity of the coolant 23 that is output from the electric resistivity detector 16 (step S301). The battery ECU 51 determines whether the electric resistivity of the coolant 23 has decreased to $10^3$ Ωm, which is a first threshold, or lower (step S302). At this time, if the electric resistivity of the coolant 23 is $10^3$ Ωm or lower (step S302: YES), the battery ECU 51 raises the target power storage amount SOC of the battery assembly 12 by a few percents (step S303). Note that the command signal for raising the target power storage amount SOC is internally processed in the battery ECU 51. Also, note that the battery ECU 51 corresponds to "power storage amount monitoring portion" in the invention.

Raising the target power storage amount SOC as described above compensates for the loss of the power of the battery assembly 12 due to the power discharge caused by the decrease in the electric resistivity of the coolant 23, and this ensures battery power corresponding to the drive power required of the vehicle.

After raising the target power storage amount SOC, the battery ECU 51 determines whether the electric resistivity of the coolant 23 measured in step S304 has further decreased down to $10^2$ Ωm, which is a second threshold, or lower (step S305). At this time, if the electric resistivity of the coolant 23 is $10^2$ Ωm or lower (step S305: YES), the battery ECU 51 interrupts the output current of the battery assembly 12 in the same manner as in the first example embodiment (step S306).

Other Example 1

Figure 9:
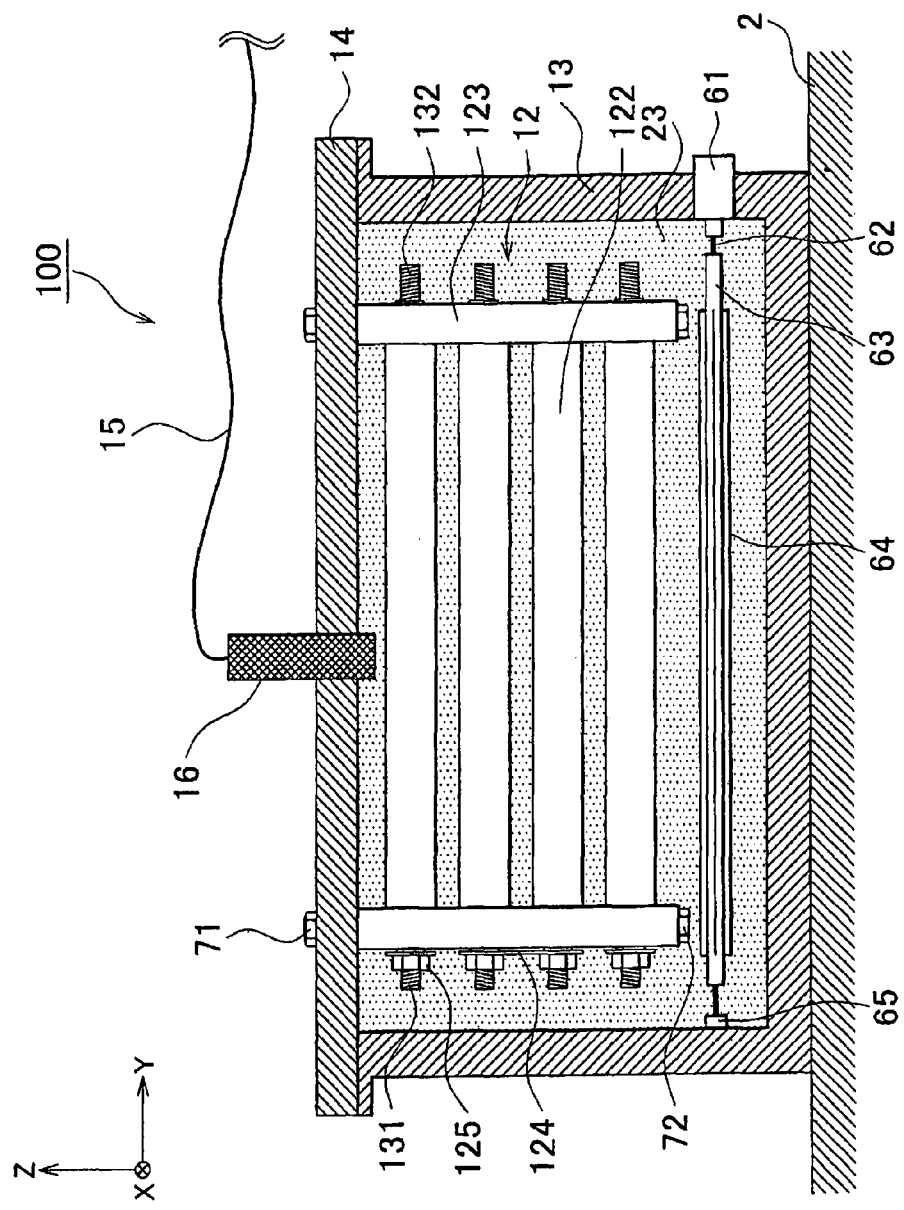
FIG. 9 is a cross-sectional view of a power storage unit according to other example.

The first to the third example embodiments can be applied also to a power storage unit 100 shown in FIG. 9. FIG. 9 is a cross-sectional view of the power storage unit 100. In FIG. 9, the structural elements functionally identical to those in the first to the third example embodiments are denoted by the same reference numerals. Referring to FIG. 9, the battery holders 123 are suspended from the case lid 14 and fixed using a pair of bolts 71 and a pair of nuts 72.

A rotational member 63 extending in the longitudinal direction of the cylindrical battery 122 is provided below the battery assembly 12, and agitating fins 64 are formed on the outer peripheral face of the rotational member 63. One end of a shaft 62 of the rotational member 63 is directly coupled with the output shaft of a motor 61, and the other end is rotatably supported by a bearing 65 provided on the inner face of the battery case 13.

As the motor 61 runs, the rotational member 63 rotates about the shaft 62 as the axis of rotation, whereby the agitating fins 64 agitate the coolant 23. This minimizes the temperature bias of the coolant 23 and thus prolongs the battery life.

As such, in the above-described example, because the flow rate of the coolant 23 is forcibly increased by the agitating means, the battery can 134 tends to wear out compared to the first to third example embodiments. However, because the electric resistivity detector 16 is provided, a decrease in the electric resistivity of the coolant 23 due to metal fragments produced due to the wearing of the battery can 134 can be promptly detected and therefore safety measures (e.g., interruption of the output current) can be taken timely.

Other Example 2

While the battery ECU 51 is adapted to first give an alarm (S203) and then interrupt the output current of the battery assembly 12 (S206) in response to a decrease in the electric resistivity of the coolant 23 in the second example embodiment, the battery ECU 51 may alternatively be adapted to only give an alarm in response to a decrease in the electric resistivity of the coolant 23. Likewise, while the battery ECU 51 is adapted to raise the target power storage amount SOC (S303) and then interrupt the output current of the battery assembly 12 (S306) in response to a decrease in the electric resistivity of the coolant 23 in the third example embodiment, the battery ECU 51 may alternatively be adapted to only raise the target power storage amount SOC in response to a decrease in the electric resistivity of the coolant 23. In either case, preferably, a gas-discharge pipe is connected to the case lid 14 and the gas in the battery case 13 (the gas produced by the cylindrical battery 122) is released via a gas-discharge valve, or the like, when necessary.

Other Example 3

While cylindrical lithium-ion batteries have been used in the foregoing example embodiments, nickel-hydrogen batteries may alternatively be used or rectangular batteries may alternatively be used. Further, electric double-layer capacitors may alternatively be used. Electric double-layer capacitors are constituted of multiple anodes and cathodes alternately stacked with separators interposed in-between. In a case where electric double-layer capacitors are used, for example, aluminum foils are used as the collectors, activated carbon is used as the positive active material and the negative active material, and porous membranes made of polyethylene are used as the separators.

The power storage unit described above may alternatively be mounted beneath the rear seat or in the trunk of the vehicle.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A power storage unit, comprising:
a power storage module;
a coolant for cooling the power storage module;
a casing containing the power storage module and the coolant;
a detecting portion that detects an electric resistance of the coolant;
a determining portion that determines whether the electric resistance detected by the detecting portion is equal to or lower than a threshold, the determining portion outputting a signal indicating that the electric resistance is reduced when the electric resistance detected by the detecting portion is equal to or lower than the threshold; and
a power storage amount monitoring portion that raises a target power storage amount of the power storage module in response to the signal being output from the determining portion.

2. The power storage unit according to claim 1, further comprising a power storage module protection portion that interrupts current output from the power storage module in response to the signal being output from the determining portion.

3. The power storage unit according to claim 1, further comprising a notifying portion that sends an notification regarding an abnormality of the power storage module in response to the signal being output from the determining portion.

4. The power storage unit according to claim 3, further comprising a discharge valve via which gas produced by the power storage module is discharged from the casing when a pressure of the gas produced by the power storage module reaches a predetermined pressure.

5. The power storage unit according to claim 1, wherein the power storage module is constituted of a plurality of power storage elements electrically connected to each other.

6. The power storage unit according to claim 1, further comprising an agitating portion for agitating the coolant.

7. The power storage unit according to claim 1, wherein the power storage module is soaked in the coolant.

8. A vehicle incorporating the power storage unit according to claim 1.

9. A power storage unit, comprising:
a power storage module;
a coolant for cooling the power storage module;
a casing containing the power storage module and the coolant;
a detecting portion that detects an electric resistance of the coolant;
a power storage amount monitoring portion that changes a target power storage amount of the power storage module depending upon the electric resistance detected by the detecting portion; and
a power storage module protection portion that interrupts current output from the power storage module depending upon the electric resistance detected by the detecting portion, wherein
the power storage amount monitoring portion raises the target power storage amount of the power storage module when the electric resistance detected by the detecting portion is equal to or lower than a first threshold, and
the power storage module protection portion interrupts the current output from the power storage module when the electric resistance detected by the detecting portion is equal to or lower than a second threshold that is equal to or lower than the first threshold.

10. The power storage unit according to claim 9, wherein the power storage module is constituted of a plurality of power storage elements electrically connected to each other.

11. The power storage unit according to claim 9, further comprising an agitating portion for agitating the coolant.

12. The power storage unit according to claim 9, wherein the power storage module is soaked in the coolant.

13. A vehicle incorporating the power storage unit according to claim 9.

* * * * *